March 11, 1952

R. R. CORSON ET AL 2,589,058

PASTE AND CREAM TUBE DISPENSER HAVING
PRESSURE JAWS AND BRUSH HOLDER

Original Filed Oct. 3, 1945

*INVENTOR.*
ROBERT R. CORSON
HARRY SCHLOSSER

BY *Victor J. Evans & Co.*

ATTORNEYS

March 11, 1952 — R. R. CORSON ET AL — 2,589,058
PASTE AND CREAM TUBE DISPENSER HAVING
PRESSURE JAWS AND BRUSH HOLDER Original Filed Oct. 3, 1945 — 2 SHEETS—SHEET 2

INVENTOR.
ROBERT R. CORSON
HARRY SCHLOSSER

BY *Victor J. Evans & Co.*

ATTORNEYS

Patented Mar. 11, 1952

2,589,058

UNITED STATES PATENT OFFICE 2,589,058

PASTE AND CREAM TUBE DISPENSER HAVING PRESSURE JAWS AND BRUSH HOLDER

Robert R. Corson and Harry Schlosser,
Haddon Heights, N. J.

Substituted for abandoned application Serial No 620,106, October 3, 1945. This application Apri 18, 1947, Serial No. 742,378

1 Claim. (Cl. 222—93)

This application is a substitute for abandoned application Serial No. 620,106, filed October 3, 1945.

The invention relates to a dispensing device, and more especially to a paste or cream tube and brush holder and paste or cream dispenser.

The primary object of the invention is the provision of a device of this character, wherein a tube of paste or cream can be conveniently placed therein, and the paste or cream dispensed from the tube for its application directly onto a toothbrush or onto the hand of a person, one or a number of tooth-brushes being removably held by the device, for service, and when not in use will be protected against dust and dirt, for sanitation.

Another object of the invention is the provision of a device of this character, wherein the paste or cream can be dispensed in determined quantities, and in this manner avoiding waste, as well as eliminating the manual handling of the tube for the dispensing of its content, the device being effective for housing the tube with the cap therefor removed, thereby doing away with the necessity of replacing the cap after each time of use of the said tube, and resultant in maintaining its content fresh and sanitary, and dispensing of the paste or cream with dispatch.

A further object of the invention is the provision of a device of this character, wherein the tube of paste or cream and the tooth-brush or brushes will be conveniently held supported for service, and are readily accessible, the paste or cream being dispensed automatically in determined quantity by hand operation of the device.

A still further object of the invention is the provision of a device of this character, which is simple in construction, thoroughly reliable and efficient in operation, strong, durable, neat in appearance, adapted to be hung from a support or wall, enabling a tube of paste or cream to be easily placed therein, it serving as a holder for tooth-brushes, thus avoiding misplacing of the same and the tube, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claim hereunto appended.

In the accompanying drawings.

Similar reference characters indicate corresponding parts throughout the several views in the drawings.

Figure 1:
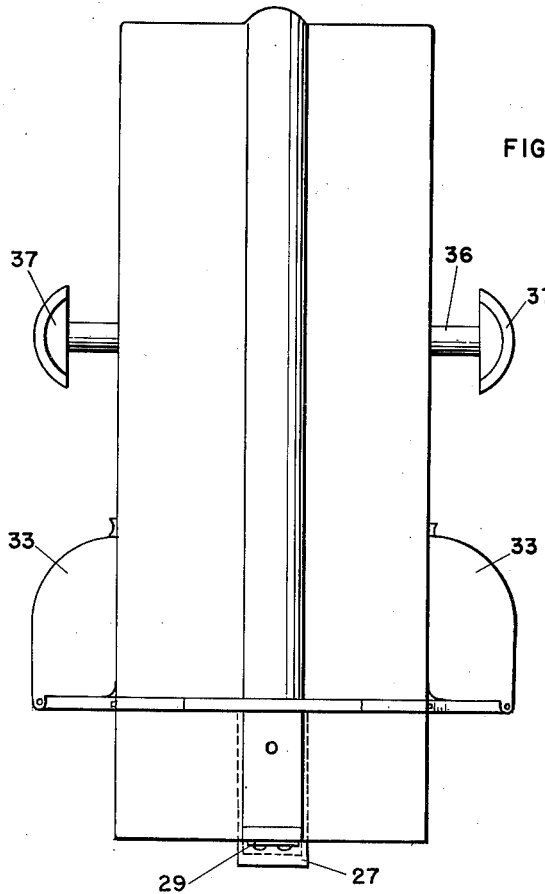
Figure 1 is a front elevation of the device constructed in accordance with the invention.
Figure 2:
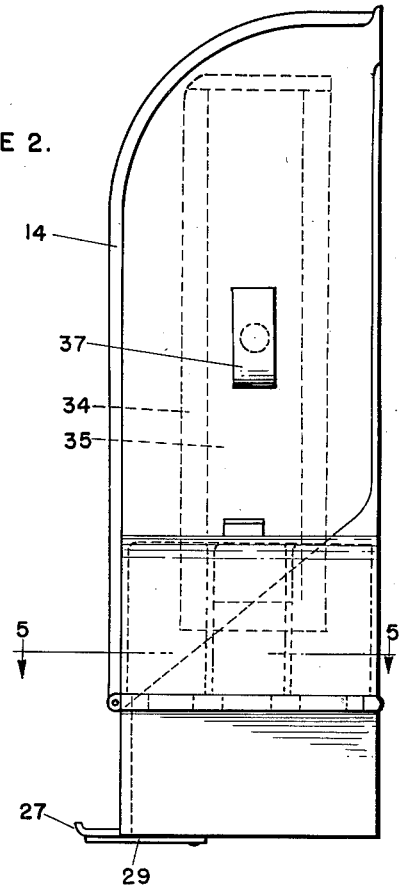
Figure 2 is a side view thereof.
Figure 5:
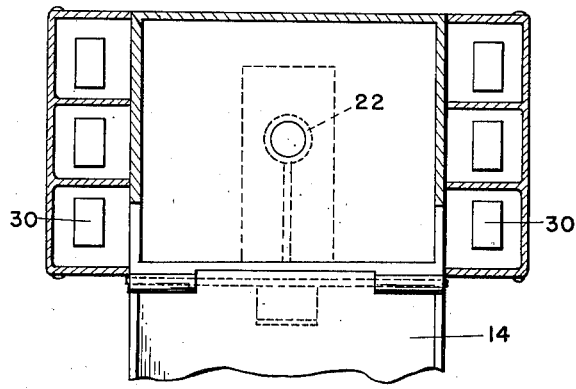
Figure 5 is a fragmentary sectional view taken on the line 5—5 of Figure 2 looking in the direction of the arrows.

Referring to the drawings in detail, the device constructed in accordance with the invention comprises a vertically disposed substantially rectangular shaped or elongated box-like casing or housing 10 having a straight vertical back wall 11, a flat horizontal bottom or flooring 12, from the latter of which rise substantially triangular shaped lower side walls 13, while the open front and open top of this casing or housing 10 is closed by a frontal door 14, it being preferably rounded as at 15 following the uppermost top area thereof. The door 14 is attached at the forward edge of the bottom or flooring 12 of the casing or housing by a hinge 16, so that such door can swing downwardly to an open position, the lowermost edges of the sides 17 of this door 14 being matched to the edges of the side walls 13 of the case or housing upon closing of the latter.

Depending from the bottom or flooring 12 is a well formation 18 to the casing or housing 10, and within it and integral with the front wall 19 thereof and with the under side of the bottom or flooring 12, medially to the latter, is a forwardly inclined web 20 having a dispensing passage 21, correspondingly inclined thereto, and opening through the front wall 19, which passage leads from an internally threaded coupling socket 22 formed in the flooring or bottom 12 and opening upwardly therethrough. This socket 22 has detachably engaged therein the externally threaded cap-neck 23 of a collapsible or compressible paste or cream tube 24, which is removably confined within the casing or housing 10 when placed therein.

Figure 6:
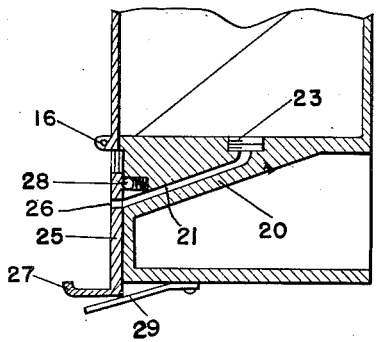
Figure 6 is a fragmentary sectional view similar to Figure 4 showing the flow cut-off gate or closure in an open position.
Figure 7:
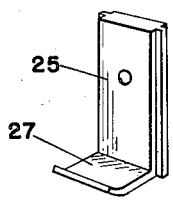
Figure 7 is a perspective view of the gate or closure detached.

Slidably fitted for vertical movement in the front wall 19 of this well formation 18 is a cut-off gate or closure 25 which has a dispensing aperture or hole 26 to be brought into or out of registration with the passage 21 by movement of the gate or closure, and when in registration paste or cream from the tube 24 will discharge through this aperture or hole for deposit on a tooth-brush or the hand of a person, the tooth-brush being supported in proper position with its bristles exposed to the path of the discharging paste or cream, upon a holding ledge or rest 27. The gate or closure 25 is held in an opening position by a spring tensioned friction latch 28 when such gate or closure is forced downwardly against the resistance of a leaf spring 29 playing thereon and carried by the well formation 18, as best seen in Figure 6 of the drawings, the downward movement to the gate or closure can be brought about by placement of the tooth-brush on the ledge or rest 27 or otherwise.

Projecting horizontally and laterally exteriorly from the casing or housing 10 at opposite side walls 13 thereof are tooth-brush holding shelves 30, each having openings 31 for receiving the handle portions of the brushes identified at 32 for the holding of the same, and overhanging these shelves 30 are opening and closing hoods 33, for the removable fitting of the brushes in the said shelves.

Figure 3:
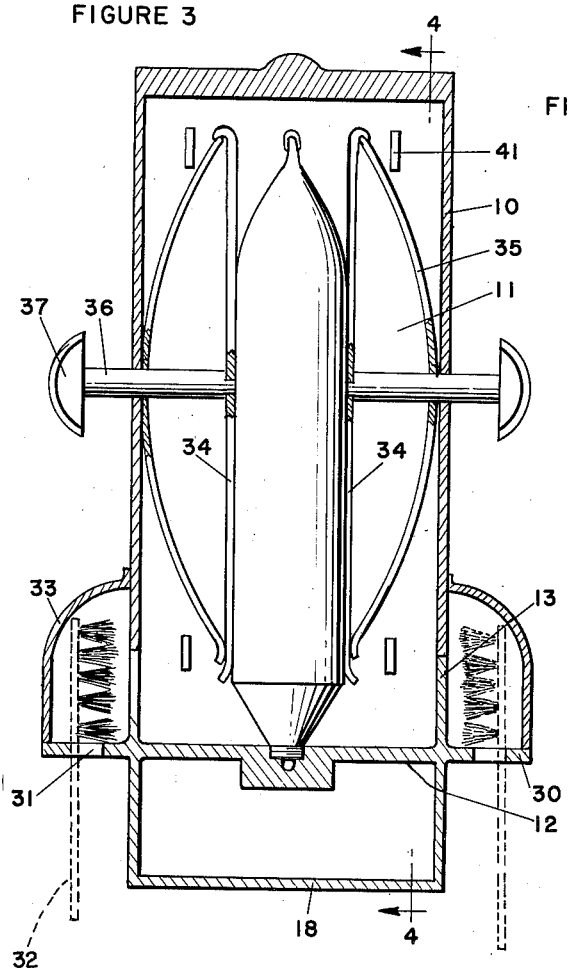
Figure 3 is a sectional view taken on the line 3—3 of Figure 4 looking in the direction of the arrows.
Figure 4:
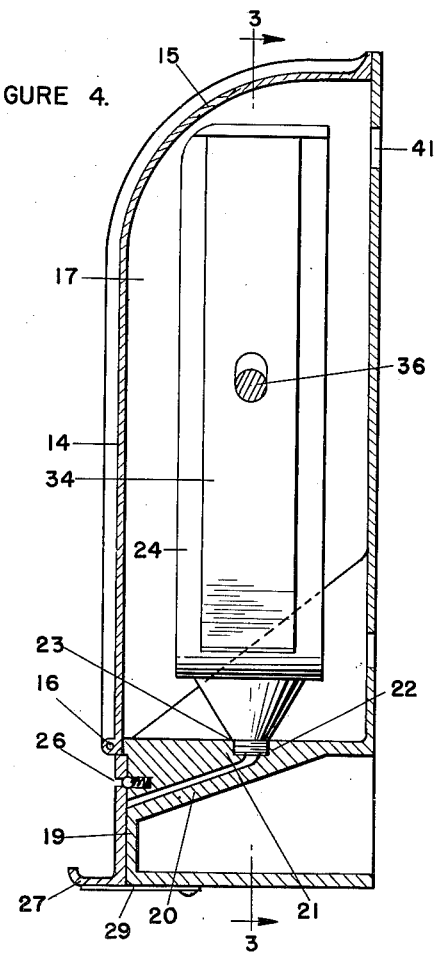
Figure 4 is a vertical transverse sectional view taken at substantially right angles to Figure 3, or on the line 4—4 of Figure 3.

Within the door 14 is arranged a pair of opposed plate-like presser jaws 34 which are adapted to be engaged against opposite sides of the tube 24 for the clamping of the latter therebetween. These jaws 34 have attached thereto bowed leaf-like tensioning springs 35 which are fitted between the the same and the sides 17 of the door 14 for bearing thereon to hold the jaws engaged with the tube, as best seen in Figure 3 of the drawings. Extending outwardly through suitable clearances in the sides 17 of the door 14 and attached to the jaws 34 intermediate thereof are hand pressed plungers 36 provided with terminal knobs 37, and by forcing these plungers inwardly, the tube 24 can be compressed or collapsed for the dispensing of its content and the discharge of the paste or cream held thereby from the device as before described.

Figure 8:
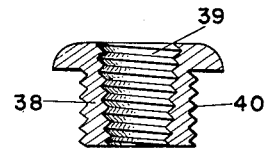
Figure 8 is a vertical sectional view through a tube-neck coupling applicator for the device.

In Figure 8 of the drawings, there is shown a tube neck coupling adapter, which is in the form of a nipple 38, having internal and external threads 39 and 40, respectively, the external threads 40 being for the detachable fitting of the nipple in the socket 22, while the internal threads 39 permit the fastening of the neck of the tube for the paste or cream, and in this manner different sizes of tubes having threaded necks can be socketed in the casing or housing 10 for the dispensing operation, as should be apparent.

The casing or housing 10 is provided with openings 41 in the back wall 11, and through the use thereof, either one or more of the said casings can be securely hung upon a support, wall or the like. The device can be made from any suitable material and is susceptible of changes, variations and modifications as fall properly within the scope of the appended claim, without departing from the spirit of the invention or sacrificing any of its advantages.

What is claimed is:

A device of the kind described, comprising a casing having a bottom portion provided with a discharge passage opening centrally of and on the bottom portion of said casing and an outlet opening in the front wall, an inclined dispensing passage forming a communication between the discharge opening and the outlet opening, a cut-off gate for the dispensing passage slidably fitted to the bottom portion for vertical movement in relation to said last said passage and said outlet opening, said gate having a dispensing aperture therein, a leaf spring fixed to the bottom of the casing and engaging the lower edge of the gate for retaining the gate in cut-off position with the outlet aperture in the gate out of alignment with the outlet opening, a spring tension friction latch in the bottom portion above the discharge passage opening therein adapted to engage the gate and latch the gate in an opening position with the outlet aperture in alignment with the outlet opening, a collapsible tube removably fastened to the bottom portion for the discharge of its content to the dispensing passage, presser jaws positioned on opposite sides of said collapsible tube, bowed leaf like tension springs engaging said casing and extending longitudinally thereof and said springs engaging the ends of said pressure jaws for holding the jaws engaged with the tube, plungers attached to the pressure jaws centrally thereof and extending outwardly of said casing, knobs on the outer ends of said plungers for the manual operation of said plungers for the collapsing of said tube, a changeable adapter for removably connecting the tube with the bottom portion of the casing in alignment with the discharge passage opening and protected brush holders exteriorly associated with the casing.

ROBERT R. CORSON.
HARRY SCHLOSSER.

REFERENCES CITED

The following references are of record in the file of this patent:

UNITED STATES PATENTS

| Number | Name | Date |
|--------|------|------|
| 1,139,134 | Miller | May 11, 1915 |
| 1,249,289 | Bigoney | Dec. 4, 1917 |
| 1,386,044 | Wilson | Aug. 2, 1921 |
| 1,507,464 | Clegg | Sept. 2, 1924 |
| 1,583,813 | Thwaites | May 11, 1926 |
| 1,832,287 | Errig | Nov. 17, 1931 |
| 1,876,489 | Collins | Sept. 6, 1932 |
| 2,069,018 | Rayburn | Jan. 26, 1937 |
| 2,251,574 | O'Neill | Aug. 5, 1941 |

FOREIGN PATENTS

| Number | Country | Date |
|--------|---------|------|
| 304,123 | Germany | Mar. 4, 1918 |